United States Patent [19]
Downs

[11] 3,946,843
[45] Mar. 30, 1976

[54] MECHANICAL TORQUE TRANSMITTING DEVICE

[76] Inventor: David C. Downs, 402 Virginia, Ann Arbor, Mich. 48104

[22] Filed: Sept. 26, 1974

[21] Appl. No.: 509,559

[52] U.S. Cl. ............................................. 192/45.1
[51] Int. Cl.² ........................................ F16D 41/06
[58] Field of Search .................... 192/45.1; 188/82.8

[56] References Cited
UNITED STATES PATENTS

| | | | |
|---|---|---|---|
| 531,577 | 12/1894 | Teal .................................. | 192/45.1 |
| 1,924,579 | 8/1933 | Waterhouse ..................... | 192/45.1 X |
| 2,689,633 | 9/1954 | Turner ............................. | 192/45.1 X |
| 2,707,038 | 4/1955 | Szady ................................ | 192/45.1 |

*Primary Examiner*—Allan D. Herrmann
*Attorney, Agent, or Firm*—James M. Deimen

[57] ABSTRACT

A mechanical torque transmitting device such as a one-way clutch comprising a cylindrical engagement surface and one or more disc elements having members extending therefrom and flexibly attached thereto. The members are adapted to edgewise frictionally engage the cylindrical surface whereby relative rotation between the cylindrical surface and the disc elements in one direction causes frictional slippage of the members and relative rotation in the opposite direction causes tight driving engagement. In a preferred embodiment the flexible attachment of a member is spaced from the radial plane intersecting the engagement thereby providing compressive loading at the attachment during tight driving engagement. The attachment is relatively stiff in compression and flexible in bending, a bending load being applied thereto during frictional slippage. The preferred embodiments disclose versatile and economical constructions possible with the invention.

23 Claims, 7 Drawing Figures

MECHANICAL TORQUE TRANSMITTING DEVICE

BACKGROUND OF THE INVENTION

Prior art mechanical torque transmitting devices, such as clutches and brakes, are typified by U.S. Pat. Nos. 3,129,798; 3,730,316; and 1,967,749, as well as the many devices in common everyday use. One way automatically engageable clutches and brakes often require the assembly of a plurality of small separate parts such as pawls that unduly add to the manufacturing cost. Therefore, further simplification of such devices for more economical manufacture and with equal or greater versatility in use is a desirable goal.

SUMMARY OF THE INVENTION

The invention comprises a cylindrical surface element and one or more disc elements having members extending therefrom and adapted to edgewise frictionally engage the cylindrical surface. The members are flexibly attached to the discs in a geometrical relationship that allows frictional slippage of the engagement with relative rotation of the cylindrical surface in one direction and tight torque transmitting engagement with relative rotation in the opposite direction. In a preferred embodiment having a plurality of discs, a typical disc includes a plurality of members integrally extending therefrom and formed from a single relatively thin piece of stock. The attachment or connection of each member to the disc is located relative to the frictional engagement of the member with the cylindrical surface and relative to the center of the disc such that under tight driving engagement the vector sum of the frictional driving force on each member is directed substantially through the center of the member's attachment. With increasing driving torque the curved engaging surface of each member contacts the cylindrical surface at an increasing distance from the attachment thereby causing tighter engagement. Relative motion in the opposite direction causes the vector sum of the frictional force and the normal force on each member to be directed substantially outside the connection of each member to the disc. The result is a bending load on each member which tends to disengage the member from the cylindrical surface. Thus, under tight driving engagement the driving force at the connection of each member to the disc is a substantially compressive force whereas under slipping engagement a bending load is applied at the connection. The discs with members integrally attached may be stamped, extruded or otherwise formed from suitable materials as simple units thereby greatly simplifying subsequent assembly steps of the clutch.

DESCRIPTION OF THE PREFERRED EMBODIMENTS

Figure 1:
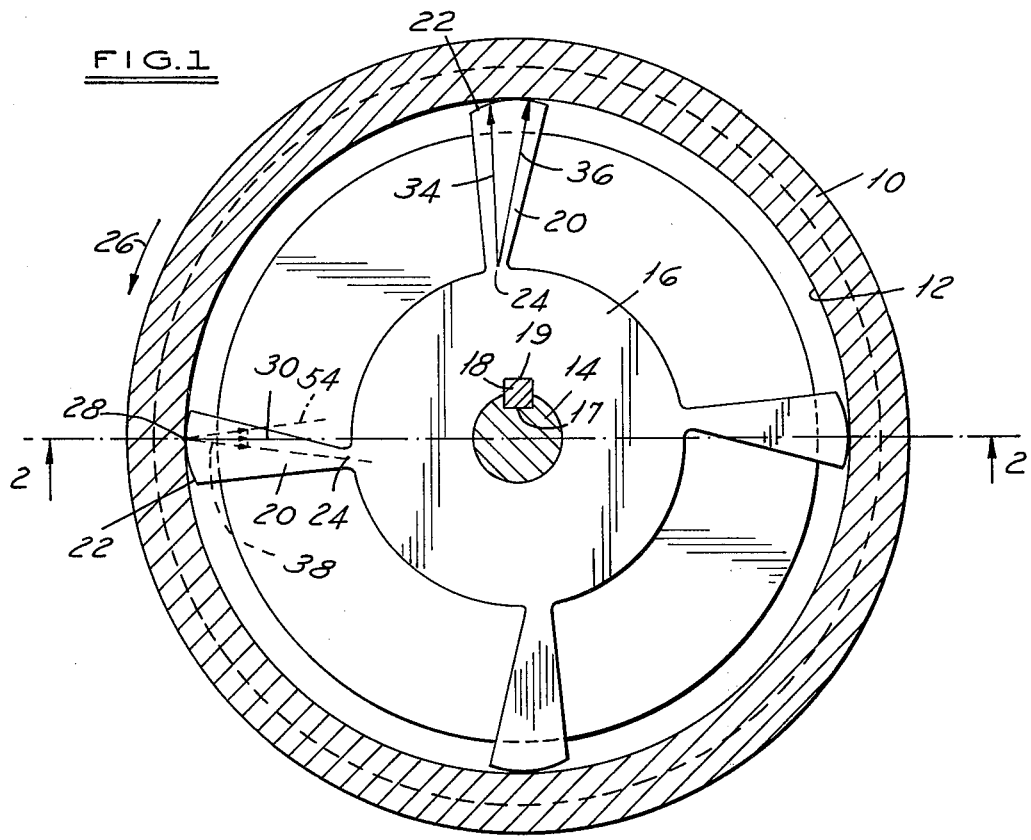
FIG. 1 is a cross section of the clutch taken along the line 1—1 of FIG. 2.
Figure 2:
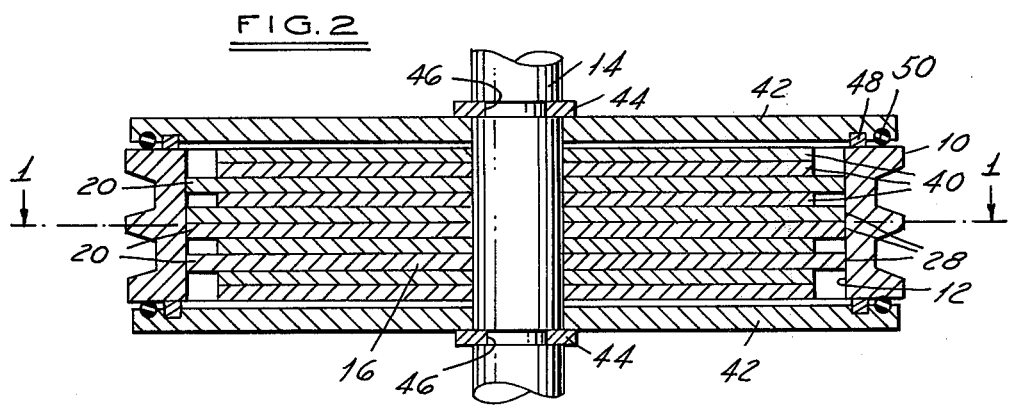
FIG. 2 is a longitudinal section taken along the line 2—2 of FIG. 1.

In FIGS. 1 and 2 the clutch is embodied as a part of a sheave mounted on a keyed shaft. Usage as a sheave is shown only for illustrative purposes and other driven or driving elements such as sprockets and splines may be easily envisioned. The clutch has an outer first element 10 having a cylindrical engagement surface 12 comprising the inner surface thereof. The clutch is mounted on a shaft 14 and either the shaft 14 or the first element 10 may be the driving or driven member. Located within the first element 10 are a plurality of relatively thin disc members 16 engaging the shaft 14 with a key 18. Integrally attached to each disc 16 are a plurality of engagement members 20 having curved surfaces or edges 22 formed for engagement with the cylindrical engagement surface 12. The connection of each member 20 with the disc 16 comprises a narrow neck 24 which can flex in the plane of the disc 16. Four members 20 are shown for each disc in FIGS. 1 and 2, however a lesser or greater number may be utilized as preferred to obtain the torque transmitting capacity per disc desired or to meet limiting external dimensions of the first element 10. Discs having three members will tend to be automatically self centering.

Typically the discs and members may be stamped or otherwise formed from thin flat sheet stock of a suitable material such as steel and the surfaces 22 may be flame hardened and ground or otherwise treated for suitable wear resistance and accuracy. For some applications further treatment after stamping is unnecessary thus allowing extremely inexpensive manufacture of the disc elements. Alternatively the discs and members may be formed integrally by an extrusion or moulding process and sliced to the thickness desired. Such a forming process is advantageously suited to easily extrudable or moldable metals and plastics for light duty clock applications. Thus a single relatively thick disc having all members integrally attached thereto can be manufactured very economically for a clutch utilizing a single disc element.

Figure 2A:
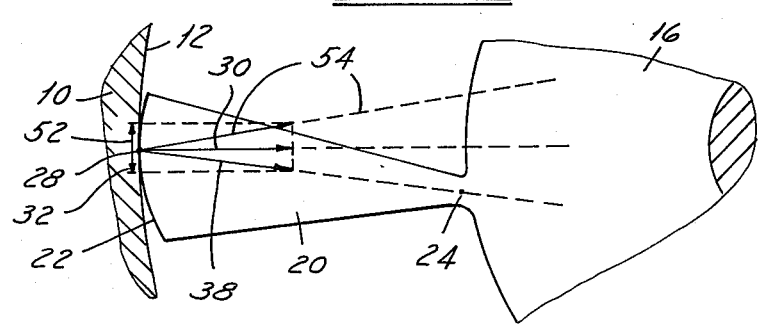
FIG. 2A is a vector diagram illustrating the forces imposed on a member.
Figure 3:
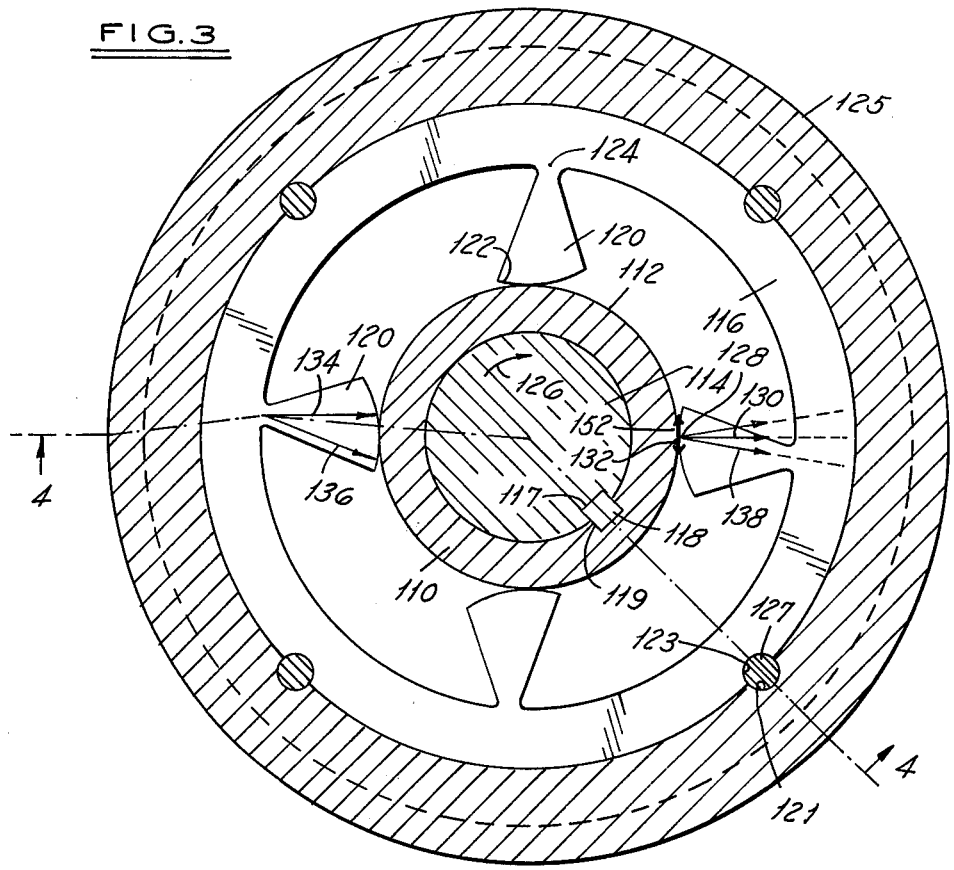
FIG. 3 is a cross section of an alternate embodiment of the clutch taken along the line 3—3 of FIG. 4.

Assuming the first element 10 to be the driving member and rotating counterclockwise in FIG. 1 as given by the arrow 26, tight driving engagement with the members 20 will ensue. As assembled, the clutch members 20 engage the cylindrical surface 12 with a slight normal force at engagement lines 28. The engagement lines 28 are parallel to the axis of rotation (centerline of shaft 14). In the vector diagram of FIG. 2A the normal force is shown by the radial arrow 30. The tangential friction force developed at the engagement line 28 is illustrated by the arrow 32 and for most engineering materials is assumed to be directly proportional to the normal force 30. Under tight driving engagement the friction force 32 tends to rotate the member 20 counterclockwise relative to the disc; however, the engagement surface 22 is shaped to provide increasing distance from the neck 24 in the clockwise direction, as shown by the arrows 34 and 36, arrow 34 being as shown shorter than arrow 36. The actual shape of a curved surface 22 may be a circular arc as shown in FIG. 1 or non-circular as shown in FIG. 3. The increasing distance from the neck 24 effectively tightens the engagement. In actual operation the radial distance of the engaging line 28 from the clutch centerline is permitted to increase only a slight amount because of the rigidity of the surface 12 on the first element 10. Thus with typical engineering materials and manufacturing accuracy the arcuate shift of the engagement line 28 is very slight for tight driving engagement. The slight movement of each member 20 counterclockwise relative to the disc 16 is strongly resisted. Increasing the torque transmitted by the clutch causes normal force 30 and tangential force 32 to increase in direct proportion to each other. The result of these forces therefore continues to be directed substantially along line 38 through the neck 24. The substantially compressive load at the narrow neck 24 thereby increases with increasing input torque under tight driving engagement of the clutch.

In order to assure that buckling under the compressive load at the neck 24 does not occur the discs 16 may be located next to each other as shown at the center of the clutch in FIG. 2 or spacing discs 40 may be positioned adjacent the discs 16 to provide lateral supporting means. The provision of spacing discs 40 allows the load carrying capacity of each clutch to be individually selected at the time of assembly merely by specifying the number of discs 16 to be assembled on the shaft 14 with the remaining volume substantially filled by discs 40. As shown in FIG. 2 there are four driving discs 16 and six spacing discs 40. However, up to ten driving discs 16 could be inserted in the clutch of FIGS. 1 and 2. Thus, the total member of discs is only restricted by the individual disc thicknesses relative to the axial length of the clutch interior.

The clutch of FIGS. 1 and 2 also include circular side plates 42 longitudinally positioning the clutch on the shaft 14 with retaining rings 44 located in circumferential grooves 46 in the shaft. O-ring seals 50 and axial thrust pads or journals 48 are provided to prevent foreign matter from entering the clutch mechanism and to accommodate any axial thrust that may occur although under normal operation such thrust is minimal and merely required to maintain alignment. The plurality of thin discs 16 with individual members 20 allows the members to individually accommodate variations in the concentricity of the cylindrical surface 12 in the axial direction. For light duty use a clutch embodying only one disc 16 may be utilized. Such a clutch may be more suitably constructed by matching the axial length of the cylindrical engaging surface 12 to the thickness of the disc 16. The disc 16 and integral members 20 may be formed by extrusion as noted above and sliced to match the surface 12.

Returning to FIGS. 1, 2 and 2A, assuming the first element 10 to be the driving member and rotating clockwise in FIG. 1, slippage of the driving engagement will ensue as follows. The tangential frictional force developed at the engagement line 28 is illustrated by the arrow 52 and is assumed to be directly proportional to the normal force 30. However, the vector sum of the normal force 30 and the frictional force 52 is directed along a line 54 which passes substantially beyond the neck 24. Thus, the force on the member 20 relative to the disc 16 flexes the member 20 clockwise about the neck 24. Since the distance of the engagement line 28 from the neck 24 decreases as the member 20 is slightly flexed clockwise, the engaging surface 22 will tend to recede from the cylindrical surface 12 and the normal force 30 will decrease to a minimum amount prescribed by an equilibrium condition between the tangential frictional force 54 and the restoring couple developed at the flexible neck 24.

The use of a plurality of thin discs and members allows each member to independently achieve the equilibrium condition thereby reducing the frictional drag induced by slippage to a bare minimum.

Figure 4:
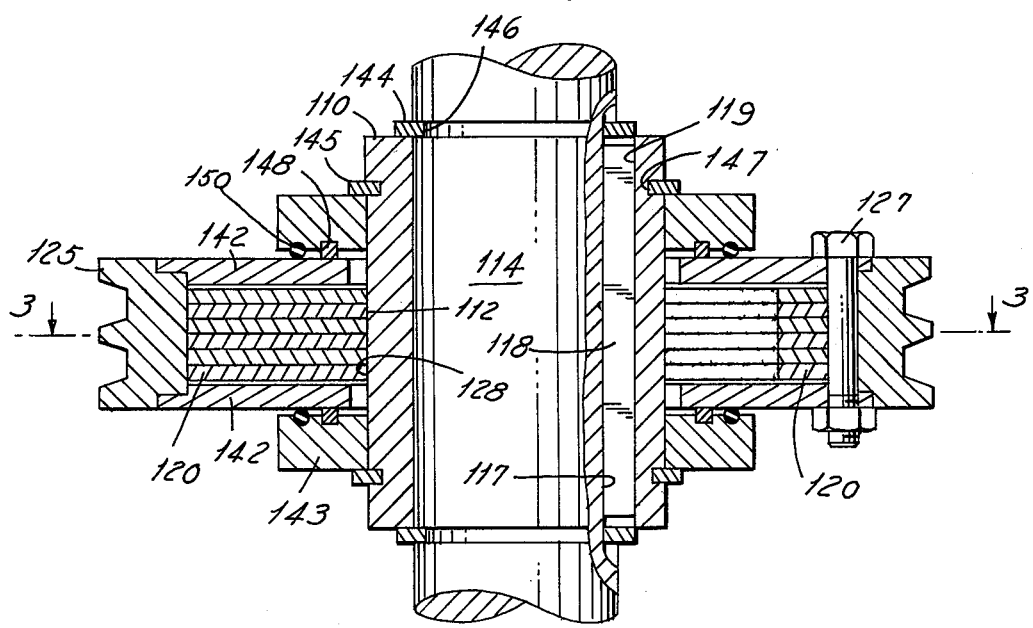
FIG. 4 is a longitudinal section taken along the line 4—4 of FIG. 3.

In FIGS. 3 and 4 an external clutch is embodied inside a sheave. The clutch has a first element 110 comprising a sleeve having the cylindrical engaging surface 112 on the outer surface thereof and engaging a shaft 114 with a key 118. The key 118 is fitted in key slots 117, 119 in the shaft 114 and the sleeve 110 respectively. Retaining rings 144 fitted in circumferential grooves 146 position the sleeve and clutch axially on the shaft 114. Concentrically positioned about the sleeve 110 are a plurality of relatively thin flat ring members 116 which correspond to the disc members 16 above. The rings 116 each have a plurality of engagement members 120 extending inwardly therefrom and having curved surfaces 122 for engagement with the cylindrical surface 112. The surfaces 122 of the external clutch, however, need not be restricted to convex but may be straight or concave as desired. Each member 120 is attached to a ring 116 by a narrow neck 124 which is relatively flexible in the plane of the ring 116 and member 120. Surrounding the plurality of rings 116 is a sheave member or other suitable driving or driven element 125. On each side of the element 125 are circular side plates 142 enclosing the rings 116 and fastened to the element 125 by bolts 127 as best shown in FIG. 4. The bolts fit in semicircular keyways 121, 123 in the element 125 and the rings 116 thereby serving to drivingly engage the rings 116 with the element 125, O-ring seals 150 and axial thrust pads 148 are positioned adjacent the side plates 142 to prevent the ingress of foreign matter and to accommodate any axial thrust, as above. The O-ring seals 150 and thrust pads 148 are held in position by circumferential thrust rings 143 which in turn are press fit or otherwise fastened to the sleeve 110 and accurately located by retaining rings 145 fitted in grooves 147 in the sleeve 10. Alternative means for preventing the ingress of foreign matter and accommodating any axial thrust may of course be envisioned.

The operation of the clutch in FIGS. 3 and 4 is similar to the clutch of FIGS. 1 and 2. More specifically, a normal force 130 is developed at a typical engagement location 128. Assuming the shaft 114 and sleeve 110 to be drivingly rotated clockwise as given by the arrow 126, a frictional driving force occurs at the line 128 as shown by the arrow 132. The resultant driving force is indicated by the arrow 138 located on a line extending from the line 128 through the narrow neck 124 of the member 120. Slight flexing of the member 120 results in tight driving engagement because of the distance of the engagement line 128 from the neck 124 increasing as above. The changing arcuate position of the line 128 on the surface 122 increases the distance between the center of the shaft 114 and the element 125. This increase is resisted by the overall structure resulting in a tight engagement. While no spacing discs are shown in the embodiment of FIGS. 3 and 4 they could be similarly used in the form of rings to replace some of the rings 116.

If the shaft 114 is drivingly rotated counterclockwise, frictional slippage will occur. Since the frictional force developed at the engagement line 128 is as shown by arrow 152, the member 120 slightly flexes counterclockwise and disengages the surface 122 until the friction force 152 and the couple developed by the flexure at the neck 124 are in equilibrium. Alternatively, the element 125 may be the driving element. Thus, in FIG. 3 slippage will occur with clockwise driving rotation of element 125 and tight driving engagement will occur with counterclockwise driving rotation of element 125.

Figure 5:
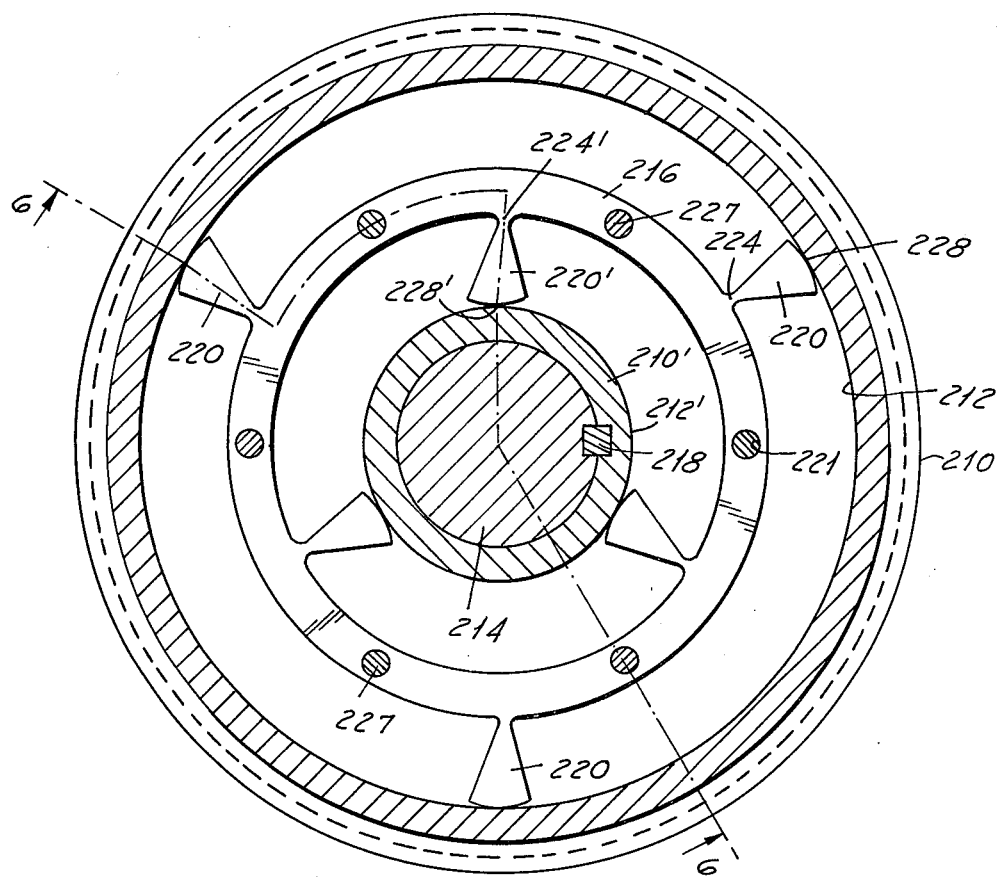
FIG. 5 is a cross section of a second alternate embodiment of the clutch taken along the line 5—5 of FIG. 5—5 of FIG. 6; and, FIG. 6 is a longitudinal section taken along the line 6—6 of FIG. 5.
Figure 6:
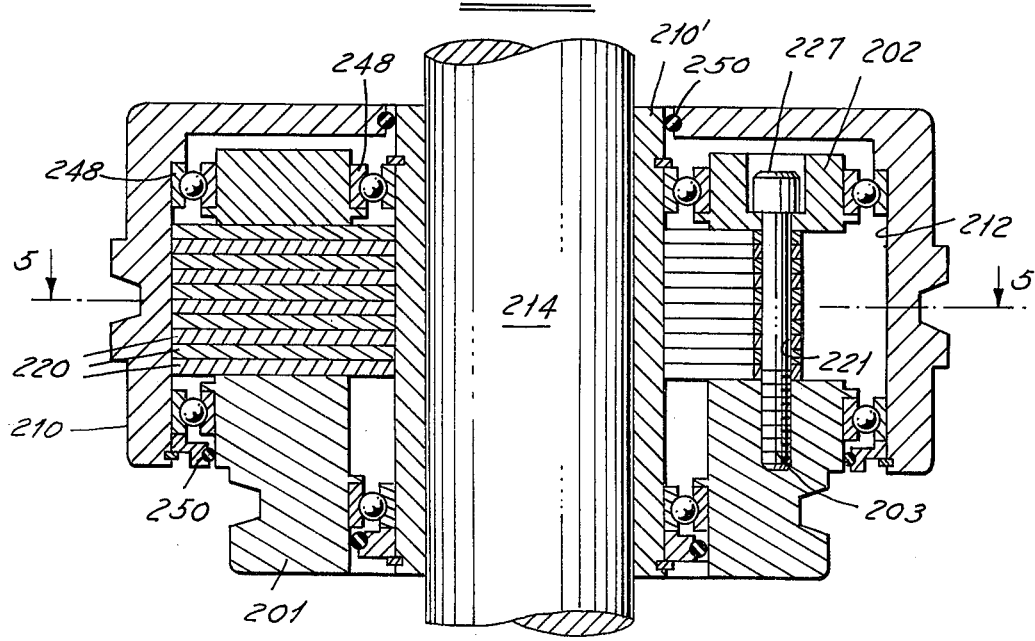

In FIGS. 5 and 6 a third embodiment of the clutch is shown. This embodiment combines both the internal and external clutches above with the driving input to an element 201 directly fastened to ring members 216. Bolts 227 engage a head ring 202, pass through holes 221 in the rings 216 and are threaded into the driving element 201 at 203. The rings 216 include integrally attached members 220 adapted to engage the peripheral element 210 on the cylindrical surface 212 in a manner similar to that above. As shown in FIG. 5, clockwise driving movement of element 201 will cause tight driving engagement of the members 220 with the peripheral element 210. The members 220 are joined to the rings 216 by flexible necks 224. The rings 216 also include members 220' extending towards the axial shaft 214 and adapted to engage the cylindrical surface 212' of the sleeve 210'. Driving rotation of the element 201 in the counterclockwise direction will cause tight driving engagement of the members 220' with the sleeve 210' in turn driving shaft 214 through the key 218. In summary therefore, clockwise driving rotation of the element 201 causes tight driving engagement of the peripheral element 210 and slipping engagement with the sleeve 210' whereas counterclockwise driving rotation of the element 201 causes tight driving engagement with the sleeve 210' and slippage with the peripheral element 210. The clutch of FIGS. 5 and 6 therefore combines the features of the clutches shown in FIGS. 1 through 4 into a single unit. Ball bearings 248 and dust seals 250 are shown as required to complete the unit.

I claim:

1. Torque transmitting means comprising, a first element having cylindrical engagement means, a second element coaxial with the first element and rotatable relative thereto;
 a plurality of members integrally connected to the second element and extending therefrom, surfaces on the members adapted to frictionally engage the cylindrical engagement means, the integral connections adapted to flexibly urge the members into contact with the first element, whereby relative rotation between the first element and the second element in one direction causes slippage of the frictional engagement and opposite relative rotation causes tight frictional driving engagement;
 and characterized by, the surfaces having radii of curvature substantially different from the radius of the cylindrical engagement means and the corresponding integral connections being displaced from the corresponding radii joining the frictional engagements to the cylindrical axis whereby the respective vector sums of the normal and tangential forces on the members are directed along imaginary chordal lines joining the respective frictional engagements and the centers of the integral connections during tight frictional driving engagement.

2. The torque transmitting means of claim 1 wherein a substantially compressive force is directed through the integral connection during tight frictional driving engagement.

3. The torque transmitting means of claim 1 wherein a bending force is applied about the integral connection during slippage of the frictional engagement.

4. The torque transmitting means of claim 1 wherein the surfaces engage the cylindrical engagement means along lines parallel to the axis of the cylindrical engagement means.

5. The torque transmitting means of claim 1 wherein the respective vector sums of the normal and tangential forces on the members are substantially directed along imaginary chordal lines extending from the respective frictional engagements and spaced from the integral connections during the slippage engagement.

6. The torque transmitting means of claim 1 wherein the second elements and members attached thereto comprise thin flat discs with the members extending therefrom.

7. The torque transmitting means of claim 1 wherein the second elements and members attached thereto comprise thin flat rings with the members extending therefrom.

8. The torque transmitting means of claim 1 wherein the effective distance between the connection and the engagement tends to increase with increasing tight driving engagement.

9. The torque transmitting means of claim 1 wherein the effective distance between the connection and the engagement tends to decrease with increasing slippage engagement.

10. The torque transmitting means of claim 1 wherein the surfaces on the members are curved.

11. The torque transmitting means of claim 1 wherein the second element is exchangeable with a substitute second element having a different number of members integrally extending therefrom whereby the torque transmitting capacity and the frictional slippage resistance can be changed.

12. Torque transmitting means comprising, a first element having cylindrical engagement means, a plurality of relatively thin second elements coaxial with the first element and rotatable relative thereto;
 a plurality of members integrally connected to and extending from each of the second elements and surfaces on the members adapted to edgewise frictionally engage the cylindrical engagement means, whereby relative rotation between the first element and the second elements in one direction causes slippage of the frictional engagements and opposite relative rotation causes tight frictional driving engagement;
 and characterized by, the surfaces having radii of curvature substantially different from the radius of the cylindrical engagement means and the corresponding integral connections being displaced from the corresponding radii joining the frictional engagements to the cylindrical axis whereby the respective vector sums of the normal and tangential forces on the members are directed along imaginary chordal lines joining the respective frictional engagements and the centers of the integral connections during tight frictional driving engagement.

13. The torque transmitting means of claim 12 wherein individual second elements are exchangeable with spacing means whereby the torque transmitting capacity and the frictional slippage resistance can be changed.

14. The torque transmitting means of claim 12 wherein individual second elements are exchangeable with substitute second elements having a different number of members integrally extending therefrom whereby the torque transmitting capacity and the frictional slippage resistance can be changed.

15. The torque transmitting means of claim 12 wherein the integral connections of the members to the second elements are (by flexible means) adapted to flexibly urge the members into contact with the first element.

16. The torque transmitting means of claim 15 including lateral supporting means adapted to substantially prevent lateral flexibility of the integral connections.

17. The torque transmitting means of claim 16 wherein the supporting means are located adjacent the integral connections.

18. The torque transmitting means of claim 15 wherein the respective vector sums of the normal and tangential forces on the members are substantially directed along imaginary chordal lines extending from the respective frictional engagements and spaced from the flexible means during the slippage engagement.

19. The torque transmitting means of claim 15 wherein the second elements and members attached thereto comprise thin flat discs with the integral connections flexible in the planes of the discs.

20. The torque transmitting means of claim 19 wherein the second elements and members attached thereto comprise thin flat rings with the integral connections flexible in the planes of the rings.

21. The torque transmitting means of claim 15 wherein the surfaces on the members are curved.

22. The torque transmitting means of claim 15 wherein the effective distance between the connection and the frictional engagement tends to increase with increasing tight driving engagement.

23. The torque transmitting means of claim 15 wherein the effective distance between the connection and the frictional engagement tends to decrease with increasing slippage engagement.

* * * * *

UNITED STATES PATENT OFFICE
CERTIFICATE OF CORRECTION

Patent No. 3,946,843    Dated March 30, 1976

Inventor(s) David C. Downs

It is certified that error appears in the above-identified patent and that said Letters Patent are hereby corrected as shown below:

Column 1, line 34, insert after "force" the phrase -- and the normal force --.

Column 4, line 41, delete "10" and substitute -- 110 --.

Column 8, line 7, delete "19" and substitute -- 15 --.

Signed and Sealed this

Twenty-fourth Day of August 1976

[SEAL]

Attest:

RUTH C. MASON
Attesting Officer

C. MARSHALL DANN
Commissioner of Patents and Trademarks